US012567320B2

(12) United States Patent
Campbell et al.

(10) Patent No.: US 12,567,320 B2
(45) Date of Patent: Mar. 3, 2026

(54) SYSTEMS, APPARATUS AND METHODS FOR AUTOMATICALLY TESTING SECURITY ALARM DEVICES

(71) Applicant: Communications Test Design, Inc., West Chester, PA (US)

(72) Inventors: James Campbell, Phoenixville, PA (US); Nidhin Davis, Glen Mills, PA (US); Patrick Dameron, West Chester, PA (US)

(73) Assignee: Communications Test Design, Inc

( * ) Notice: Subject to any disclaimer, the term of this patent is extended or adjusted under 35 U.S.C. 154(b) by 0 days.

(21) Appl. No.: 18/721,551

(22) PCT Filed: Jan. 25, 2023

(86) PCT No.: PCT/US2023/011511
§ 371 (c)(1),
(2) Date: Jun. 18, 2024

(87) PCT Pub. No.: WO2023/146888
PCT Pub. Date: Aug. 3, 2023

(65) Prior Publication Data
US 2025/0061798 A1 Feb. 20, 2025

Related U.S. Application Data

(60) Provisional application No. 63/302,602, filed on Jan. 25, 2022.

(51) Int. Cl.
*G08B 29/12* (2006.01)
*G05B 1/01* (2006.01)
(Continued)

(52) U.S. Cl.
CPC .............. *G08B 29/12* (2013.01); *G05B 1/01* (2013.01); *G08B 25/10* (2013.01); *G08B 29/02* (2013.01)

(58) Field of Classification Search
CPC ........ G08B 29/12; G08B 25/10; G08B 29/02; G05B 1/01
See application file for complete search history.

(56) References Cited

U.S. PATENT DOCUMENTS 9,490,920 B2 * 11/2016 Partee ................... H04L 43/045
12,124,348 B2 * 10/2024 Parsons ................. B25J 19/023
(Continued)

OTHER PUBLICATIONS

Office Action issued for Canadian Patent Application No. 3,242,192 dated May 22, 2025, 4 pages.
(Continued)

*Primary Examiner* — John A Tweel, Jr.
(74) *Attorney, Agent, or Firm* — Duane Morris LLP

(57) ABSTRACT

Systems, apparatus and methods for automatically testing security alarm devices are disclosed according to various embodiments. In one example, a disclosed system comprises: a plurality of test chambers coupled on a frame, wherein each of the test chambers is configured to house a corresponding one of a plurality of security alarm devices to be tested; and a test computer coupled to the frame, wherein the computer has a processor and a non-transitory computer readable storage medium for automatically testing the plurality of security alarm devices at the same time using a test software, wherein each of the plurality of security alarm devices is connected to the test computer.

14 Claims, 6 Drawing Sheets

(51) Int. Cl.
   *G08B 25/10*     (2006.01)
   *G08B 29/02*     (2006.01)

(56) References Cited

U.S. PATENT DOCUMENTS

| | | | |
|---|---|---|---|
| 12,393,327 B2 * | 8/2025 | Crouch | G06Q 10/0875 |
| 2013/0033279 A1 * | 2/2013 | Sozanski | G01R 29/0821 |
| | | | 324/750.27 |
| 2013/0257468 A1 * | 10/2013 | Mlinarsky | G01R 1/18 |
| | | | 324/750.27 |
| 2014/0187172 A1 | 7/2014 | Partee | |
| 2015/0127362 A1 | 5/2015 | DeBusk et al. | |
| 2018/0026737 A1 | 1/2018 | Kucheravy | |
| 2018/0054265 A1 | 2/2018 | Lee et al. | |
| 2019/0260488 A1 | 8/2019 | Emmanuel et al. | |
| 2019/0271719 A1 | 9/2019 | Sterzbach | |
| 2019/0331720 A1 | 10/2019 | Cummings | |
| 2021/0011824 A1 | 1/2021 | Parsons et al. | |

OTHER PUBLICATIONS

International Search Report and Written Opinion for corresponding PCT Application No. PCT/US2023/011511 dated Apr. 25, 2023, 9 pages.
Office Action issued for Canadian Patent Application No. 3,242,192 dated Nov. 26, 2025, 4 pages.
Extended European Search Report issued for European Patent Application No. 23747543.9 dated Jan. 8, 2026, 15 pages.

* cited by examiner

400

SYSTEMS, APPARATUS AND METHODS FOR AUTOMATICALLY TESTING SECURITY ALARM DEVICES

CROSS-REFERENCE TO RELATED APPLICATIONS

This application is a National Stage Application, filed under 35 U.S.C. 371, of International Patent Application No. PCT/US2023/011511, filed on 25 Jan. 2023, which claims priority to U.S. Provisional Application No. 63/302,602 filed 25 Jan. 2022, entitled "Systems, Apparatus and Methods for Automatically Testing Security Devices", the entireties of which are incorporated herein by reference.

FIELD

The present disclosure generally relates to systems, apparatus and methods for testing security devices, and more specifically, to systems, apparatus and methods for automatically testing multiple security alarm devices with little or without human intervention.

BACKGROUND

A security alarm device is designed to detect intrusion, such as unauthorized entry, into a building or other areas such as a home or school. The security alarm device works based on one or more sensors to ensure security. For example, an alarm may be triggered by detecting motion, temperature change, smoke, etc., depending on sensor types of the alarm device. Existing setup for testing the security alarm devices is manually performed by a user, including but not limited to: creating accounts, downloading apps, etc. Once the setup is completed, the testing itself is also completed manually by a user.

SUMMARY

An object of the present disclosure, among others, is to provide systems and methods to automatically test security alarm devices. The same systems and methods can also be used to perform functional testing of any device that allows for command based control, i.e., a device that performs a function as a result of receiving an input signal or command from a user or from another device.

In one embodiment, a system for automatically testing security alarm devices is disclosed. The system comprises: a plurality of test chambers coupled on a frame, wherein each of the test chambers is configured to house a corresponding one of a plurality of security alarm devices to be tested; and a test computer coupled to the frame, wherein the computer has a processor and a non-transitory computer readable storage medium for automatically testing the plurality of security alarm devices at the same time using a test software, wherein each of the plurality of security alarm devices is connected to the test computer.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION

Figure 1A:
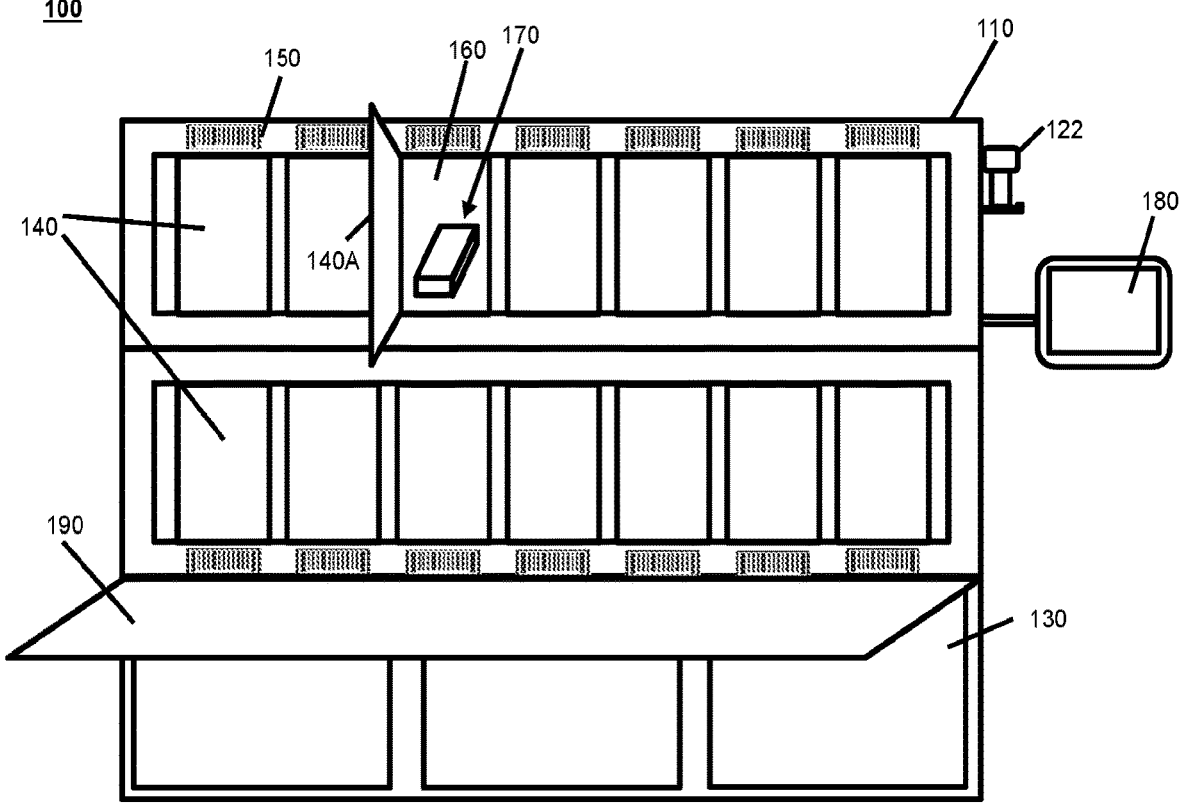
FIG. 1A illustrates a front view of an exemplary security alarm device testing apparatus, in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "vertically," "downwardly," "upwardly," etc.) should be construed to refer to the orientation as then described or as shown in the drawing under discussion. These relative terms are for convenience of description and do not require that the apparatus be constructed or operated in a particular orientation.

Various embodiments of the present disclosure provide methods and systems for automatically testing security alarm devices. The functional testing performed includes but not limited to: testing abilities to communicate via a Universal Serial Bus (USB) cable, measure temperature, and/or validate battery voltage, a microphone, a speaker, LED functionality, physical button functionality, motion sensing functionality, Wi-Fi connection, etc. All of these tests can be triggered automatically by test software running on a test computer.

The testing software automates at least one of the testing process, data collection, and testing result report. Before performing the above tests, the test computer can automatically pair the security alarm device under test to a user account. The user account may be a locally-generated account or may be an external account accessed via the internet or other computer network, and in some embodiments may be a dedicated testing account at a third party server. After the tests, a report of the testing results is generated and uploaded to a database, and the security alarm device is un-paired from the user account.

The disclosed systems and methods may be used to perform functional testing for home security alarm devices, but can also be used for any functional testing of any device that allows for command based control. The testing is automated and standardized based on the disclosed methods. In an embodiment, the test procedure is stored on a local computer/memory device. In another embodiment, the test procedure is stored on a remote computer/memory device, e.g., on the manufacturer's server of the device being tested. For example, the system automates multiple aspects of testing: the account setup, device pairing, device setup and function testing process. This automation allows for a single operator to test multiple devices at once, greatly increasing the efficiency of the operator performing the tests. This automation also increases the quality of the test by removing the human interaction from the process steps during the testing as well as data recording after the test.

An illustrative embodiment of a security alarm device testing apparatus 100 is shown in FIG. 1A. The methods in the present disclosure can be applied for not only testing security alarm devices, but also other electronic devices automatically. For example, the devices that can be tested by the disclosed system include but not limited to: motion detector, door sensor, doorbells, security alarm device, security camera, or any alarm based device.

The security alarm device testing apparatus 100, as shown in FIG. 1A, comprises a frame 110, a plurality of test chambers 140, a test equipment cabinet 130, and a user monitor 180 connecting to a test computer. Each of the plurality of test chambers 140 has a door 140A and fixtures inside the test chamber 140 for testing a corresponding security alarm device 170.

The frame 110, as shown in FIG. 1A, is a structure forming a plurality of slots 160. The plurality of test chambers 140 are each positioned in one of the plurality of slots 160 of the frame 110. The plurality of test chambers 140 may be substantially square or rectangular members, or any shape necessary to fit the slots 160.

The frame 110 has fourteen slots in an exemplary embodiment shown in FIG. 1A. That is, there are fourteen test chambers 140 in the security alarm device testing apparatus 100 in the exemplary embodiment shown in FIG. 1A. The number of slots 160, the number of test chambers 140, and correspondingly the number of security alarm devices that can be simultaneously tested, may vary based on the application. The frame 110 may be constructed out of any material that provides sufficient rigidity for the security alarm device testing apparatus 100, including metals, plastics, and other materials known to those with ordinary skill in the art.

In one embodiment, each of the plurality of test chambers 140 contains or is a radio frequency (RF) shielded cabinet located at a respective slot 160. The door 140A of each of the plurality of test chambers 140 may be moveably or slidably mounted to the frame 110. After the door 140A is opened, a security alarm device to be tested may be placed into the corresponding test chamber 140.

As shown in FIG. 1A, the security alarm device testing apparatus 100 may also include a table or shelf 190 mounted to the frame 110. In some embodiments, there are fourteen tablets or mobile phones sitting on the table 190, where each of the fourteen tablets corresponds to a respective one of the fourteen test chambers 140. In one example, each of the tablets has an application installed to control the alarm device to be tested in the corresponding test chamber. The application may be the same application installed on a user's tablet or mobile phone to control the use of the alarm device after the alarm device is sold to or otherwise owned by the user. The application in this example may receive commands initiated by a test computer connecting to the user monitor 180.

In one embodiment, the test computer is positioned in the test equipment cabinet 130. In one example shown in FIG. 1A, there are fourteen RF shielded cabinets or chambers 140 positioned in seven columns and two rows, where seven RF shielded cabinets are stacked on the other seven RF shielded cabinets respectively. The testing in each RF shielded cabinet is controlled by the test computer positioned in the test equipment cabinet 130 below the test chambers 140. For example, the test computer can send a command or signal to a tablet on the table 190 to enable the tablet to perform an action through the application, which may trigger a test on the alarm device corresponding to the tablet. For example, the command may simulate a person performing a click, touch, press or slide on the screen of the tablet, to enable an action on the application. The command or signal may be sent by the test computer to the tablet through a wireless local area network (LAN), a wired connection, a USB hub, and/or the Internet.

In one example, the device to be tested, upon receiving a signal from the application, may perform an action like taking a picture, detecting a motion, sensing an opening of a door without dis-alarm, etc. The device to be tested can send the test results, e.g. pictures, detection results, to the corresponding tablet, which may forward the test results to the test computer to analyze the test results and generate reports.

In one embodiment, the test computer has a graphic user interface (GUI) running thereon. The GUI may display list and status of tests being performed, e.g., on the user monitor 180. At the end of a test cycle, the test computer will pull all, or select ones, of the results and parametric test data from the alarm devices and display them for the operator. In one embodiment, the user monitor 180 may serve as a GUI for the test computer.

Since each test chamber 140 contains or is a RF shielded cabinet, after the door 140A is closed, a wireless signal cannot be transmitted directly through the walls of the RF shielded cabinet. In one embodiment, each RF shielded cabinet has at least one antenna mounted to and through a wall of the cabinet. In another embodiment, each RF shielded cabinet has at least one antenna on a wireless router, e.g. a Wi-Fi router, placed in the cabinet to communicate wireless signals with the alarm device and forward the signals outside the cabinet by wired cables. In another embodiment, each RF shielded cabinet has a base station device placed in the cabinet to communicate with the alarm device (wirelessly or via cable) and forward signals in and out of the cabinet by wired cables. The wired cables may connect the base station devices in the chambers or cabinets to Ethernet (or a cloud server) via a switch, to communicate with the tablets corresponding to the chambers.

In some embodiments, each tablet is associated with a user account or a test account for the corresponding chamber. Before testing an alarm device in the chamber, the application first pairs the account to the alarm device. In an example of testing motion detection, the GUI or the application may prompt an instruction instructing an operator to open the door 140A and wave a hand in front of the alarm device. Once the hand motion is detected by the alarm device, the alarm device can send a signal to the base station device, which will forward the signal to the application on the tablet. The tablet is monitored by the GUI which shows that the motion is detected by the alarm device. After all tests on the alarm device, the application may un-pair the account from the alarm device. Different chambers may be associated with different accounts.

During a setup or initialization phase, the application on each tablet can quickly check whether a base station device is present and can be connected for the corresponding chamber. In some embodiments, different sensors on every alarm device can be tested simultaneously in the chambers. That is, different tests may be performed simultaneously on different alarm devices and different tablets. In some embodiments, the tests of one alarm device may take around 3 to 5 minutes; and an operator can finish all tests of all fourteen devices within 8 to 30 minutes.

Each slot or chamber has a corresponding unique slot number 150, which may be a bar code. An operator can use a scanner 122 to scan the slot number 150. For example, when a bar code of a slot is scanned, a window is opened up on the GUI for entering information for that slot. Based on the entered information, the GUI can track every slot or chamber through individual threads and so that the tests in different chambers can run independently of each other.

In some embodiments, before putting an alarm device into a chamber, the operator can scan the bar code 150 for the chamber, which may trigger an instruction on the GUI for the operator to scan in another bar code for the alarm device to be tested in the chamber. The bar code for the alarm device may be an identity code, e.g. an international mobile equipment identity (IMEI), on the back of the alarm device. By scanning both bar codes, the test computer knows and the GUI shows that the specific alarm device with the scanned identity code will be tested in the chamber with the corresponding bar code.

In some embodiments, after putting an alarm device into a chamber, the operator can connect the alarm device to a power supply outlet in the chamber if the alarm device is run by power cord, or just put the alarm device on a shelf if the alarm device is run by battery.

In one embodiment, the door 140A has a magnetic lock thereon for locking the door 140A magnetically. In one embodiment, once after the testing of the security alarm device in the RF shielded cabinet or the corresponding test chambers 140 is completed, the magnetic lock on the door 140A is automatically released. After the tests, the test computer will collect all test results and send the test results to a database.

Before testing, the test software is loaded, once for the entire test, on the test computer. The security alarm device in each RF shielded cabinet 140 may connect to the same Wi-Fi network (via base stations, USB hub, and/or a Wi-Fi router) and communicate with the test computer (directly or indirectly via tablets) during testing. In one embodiment, the test computer has a processor and a non-transitory computer readable storage medium storing test software for testing a security alarm device positioned in a RF shielded cabinet 140.

In one embodiment, the apparatus or system 100 includes a scanner 122 attachable to the frame 110 and electrically connected to the test computer and configured to: scan slot numbers 150 corresponding to RF shielded cabinets or test chambers 140, scan serial numbers of the security alarm devices. For example, before testing a security alarm device, the scanner may first scan a slot number 150 above or below a corresponding test chamber or RF shielded cabinet 140 in which the security alarm device will be tested. Then, the user monitor 180 may show an instruction or indication to scan a serial number, e.g. an international mobile equipment identity (IMEI), of the corresponding alarm device during testing in the test chamber, which has the scanned slot number. Following the instruction or indication, the scanner may scan a serial number of the security alarm device to be tested before it is positioned in the test chamber for testing. After the scanning of the slot number and the serial number, the scanned serial number is associated with the scanned slot number, such that the system knows which security alarm device is tested in which slot or cabinet. Then an operator can open the door 140A, and place the security alarm device into the corresponding slot, e.g. slot N. In one embodiment, a selection, by the operator or by a signal from the test computer, is made on the test software to indicate that the testing of the security alarm device is performed in the corresponding slot N, where the test may automatically start in slot N. The door 140A may be closed by the magnetic lock on the door 140A during the test. The same scanner may then be used to scan a slot number of another slot and a serial number of another security alarm device to be tested in that slot, while the test is performed in slot N.

In some embodiments, the testing apparatus 100 may also include a sanity monitor (not shown) that can display internal views of all of the test chambers 140 of the system, when the doors 140A are closed and the tests are being performed. For example, in the example shown in FIG. 1A, where there are fourteen test chambers 140, the sanity monitor may show what is going on in each of the fourteen chambers in fourteen split screen views in the sanity monitor. In one embodiment, the fourteen split screen views have a same size. In another embodiment, after one chamber or cabinet is selected, the selected chamber is shown in a large screen view, and the other thirteen chambers are shown in three small screen views respectively.

In some embodiments, an alarm device may be tested without using any tablet or mobile phone. In this case, the test computer in the test equipment cabinet 130 may be connected serially to the alarm devices in the chambers via a USB hub and USB cables. In some embodiments, there may be a single board computer (SBC) placed in each chamber, such that the alarm device is connected to the Ethernet and the test computer via the SBC and USB cables. In some embodiments, the alarm device to be tested has pre-installed firmware for testing various functions of the alarm device, such that the software on the test computer can communicate with the firmware to perform tests, without using any tablet or mobile phone there-between.

In some embodiments, the tests of the camera, speaker and microphone are tests automatically performed by the firmware. For example, the alarm device may emit a tone, and the firmware on the alarm device can use its own microphone to do some analysis, and can feed back to the speaker and microphone test results to the test computer. For camera or motion testing, an operator may wave a hand or other object in front of the camera for a motion test, and press a reset button, when instructed by the GUI, on the camera, e.g. to cycle through all or select functional modes of the camera. In some embodiments, there is an additional monitor (mounted to the frame 110) showing a picture taken by the camera in the chamber. After the tests, the test computer will collect all test results and send the test results to a database.

In some embodiments, all cabling, hubs and extensions for power and communication related to the testing are inside the frame 110. Input/output (I/O) devices and AC power may also be supplied inside the test chambers to perform the setup and testing.

Figure 1B:
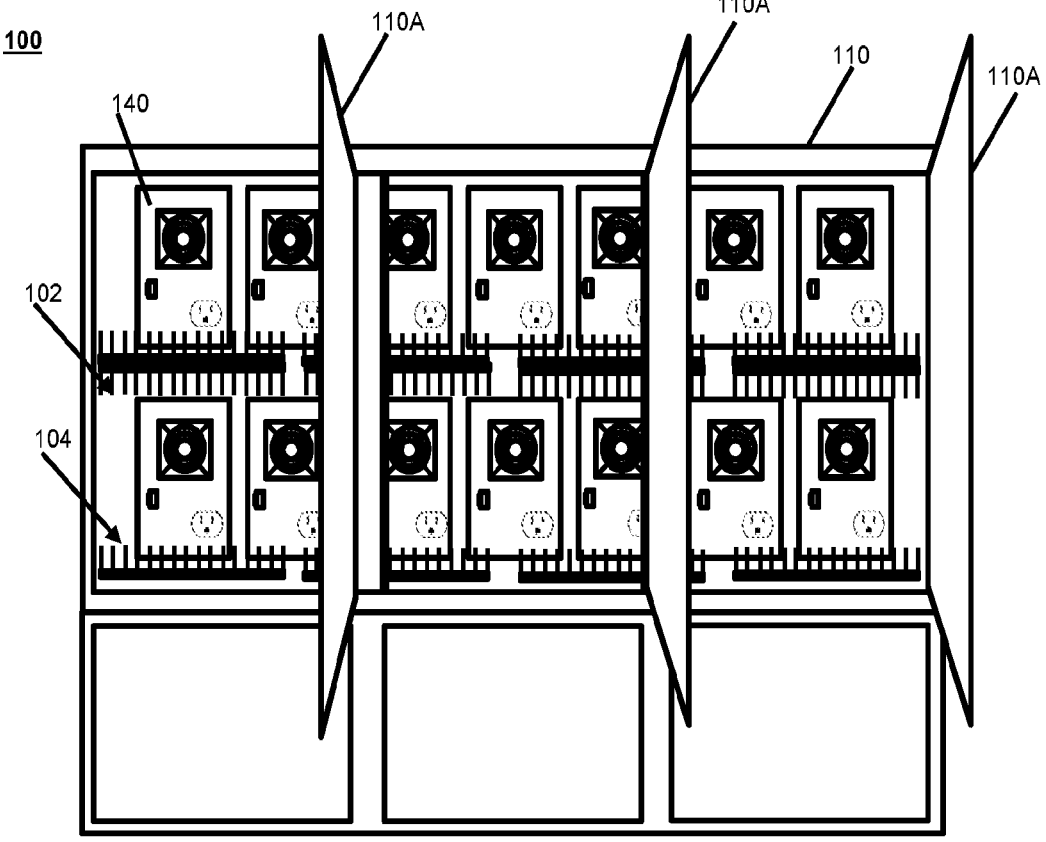
FIG. 1B illustrates a rear view of an exemplary security alarm device testing apparatus, in accordance with some embodiments of the present disclosure.

FIG. 1B illustrates a rear view of the exemplary security alarm device testing apparatus 100, in accordance with some embodiments of the present disclosure. As shown in FIG. 1B, doors 110A can be opened from the back of the frame 110, for an operator to connect or disconnect cables to the back of each test chamber 140. Cable management devices 102, 104 may be configured to manage data cables and power cables respectively. In some embodiments, an outlet power strip for fan power can be plugged into the back of the test chambers 140 as well.

Figure 2A:
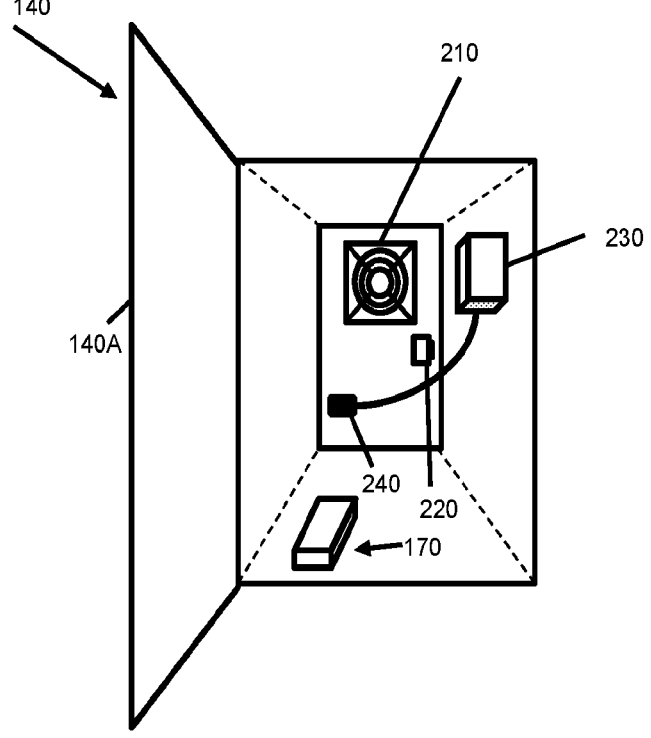
FIG. 2A illustrates a front view of an exemplary test chamber on a security alarm device testing apparatus, in accordance with some embodiments of the present disclosure.

FIG. 2A illustrates a front and inside view of an exemplary test chamber 140 on a security alarm device testing apparatus, e.g. the security alarm device testing apparatus 100 in FIG. 1A and FIG. 1B, in accordance with some embodiments of the present disclosure. As shown in FIG. 2A, with the door 140A open, there are various components inside the test chamber 140 for testing the alarm device 170. For example, the test chamber 140 may include a fan 210 mounted through the back wall of the test chamber 140, an Ethernet interface 220 through the back wall of the test chamber 140, and an outlet power strip 230 mounted on a side wall of the test chamber 140. The outlet power strip may receive power from outside the test chamber 140 via a power cable 240 connecting to a power entry module on the back wall of the test chamber 140, and provide power to any device placed inside the test chamber 140.

Figure 2B:
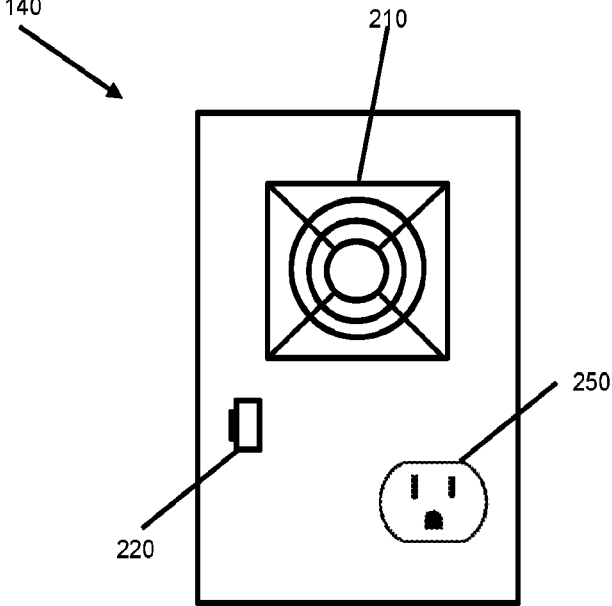
FIG. 2B illustrates a rear view of an exemplary test chamber on a security alarm device testing apparatus, in accordance with some embodiments of the present disclosure.

FIG. 2B illustrates a rear view of an exemplary test chamber 140 on a security alarm device testing apparatus, e.g. the security alarm device testing apparatus 100 in FIG. 1A and FIG. 1B, in accordance with some embodiments of the present disclosure. As shown in FIG. 2B, on the back of the test chamber 140, there are various components including: the fan 210 mounted through the back wall of the test chamber 140, the Ethernet interface or coupler 220 on and through the back wall of the test chamber 140, and a power entry module 250 for receiving power from outside the test chamber 140 via a power cable.

In some embodiments, the Ethernet coupler 220 of each test chamber 140 is wire-connected to a corresponding port of a network switch, which may include at least fourteen ports. In addition, one port of the network switch may be wire-connected to a port of a wireless router in the test equipment cabinet 130. Further, one port of the network switch may be wire-connected to a port on a test computer in the test equipment cabinet 130. The power entry module 250 on each test chamber 140 may be plugged into a corresponding power outlet to receive electric power.

Figure 3:
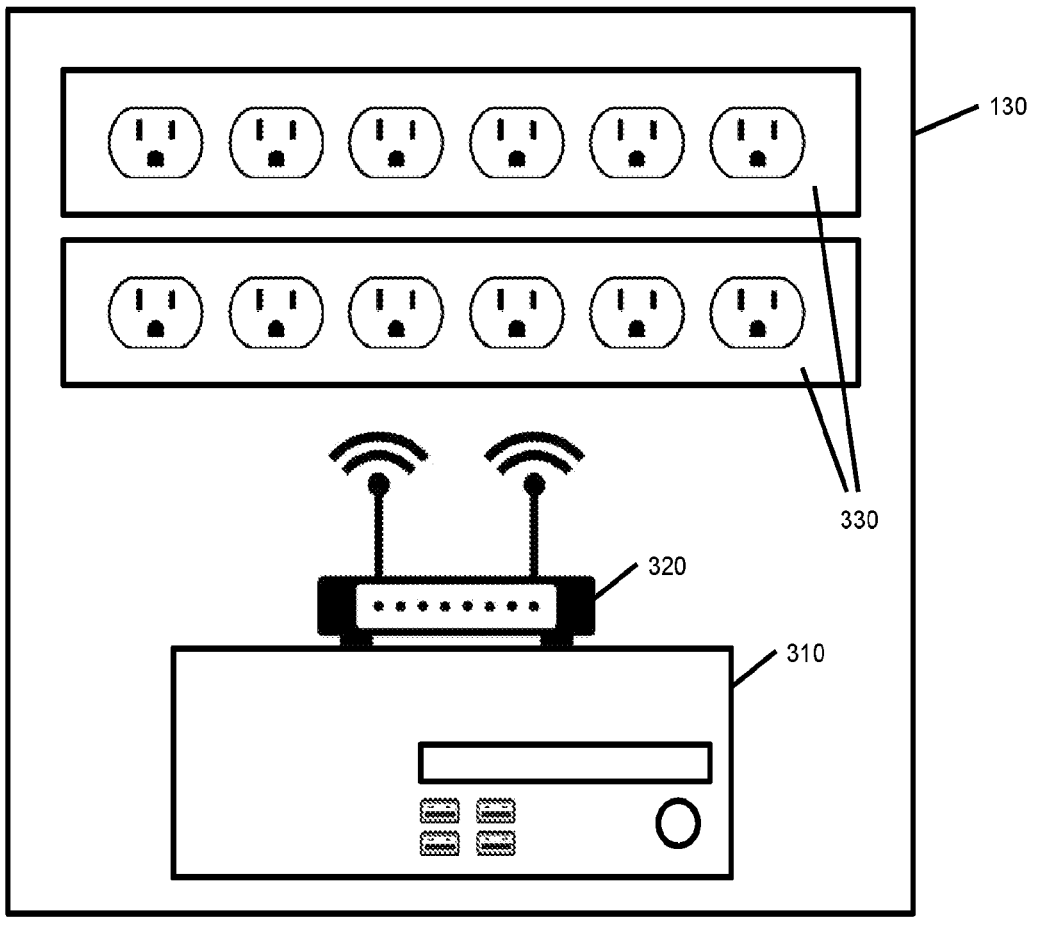
FIG. 3 illustrates an inside view of an exemplary test equipment cabinet on a security alarm device testing apparatus, in accordance with some embodiments of the present disclosure.

FIG. 3 illustrates an inside view of an exemplary test equipment cabinet 130 on a security alarm device testing apparatus, e.g. the security alarm device testing apparatus 100 in FIG. 1A and FIG. 1B, in accordance with some embodiments of the present disclosure. As shown in FIG. 3, there are various devices and components placed inside the test equipment cabinet 130, including e.g.: a test computer 310, a wireless router 320, and outlet power strips 330. The test computer and the wireless router may be configured to perform actions during testing the alarm devices placed in the test chambers, as discussed above.

In some embodiments, the user monitor 180 may be connected to the test computer 310 via a USB cable and/or a High-Definition Multimedia Interface (HDMI) cable. In some embodiments, the scanner used to scan the bar codes on the frame 110 and the alarm devices may be a wireless scanner or a wired scanner. For a wired scanner, it may be connected to the test computer 310 via a USB cable.

In some embodiments, there are device specific sub-fixtures in the frame. Different devices have different hardware configurations. For example, different security alarm devices may have different form factors. Some devices may have internal batteries while other devices may require an AC power or USB power to operate. The test chambers allow for device specific sub-fixtures needed to be installed and used in operations. The internals of the RF shielded cabinet allow devices to operate with minimal interference while still being in a close proximity for minimal operator movement, with layers of computational power.

In some embodiments, a security alarm device to be tested is at least one of: a home security alarm device, a security camera, or a motion sensor device. In some embodiments, the test computer is at least one of: a desktop, a work station, a laptop, a smartphone, or a tablet.

As discussed before, after scanning a slot number of the cabinet and scanning a serial number of the security alarm device, the system associates the scanned serial number with the scanned slot number. Based on the serial number of the security alarm device, the system can automatically determine, e.g. from a database stored in the test computer or in a cloud server, testing-related information of the security alarm device. In various embodiments, the testing-related information comprises information about at least one of: functions of the security alarm device, number and locations of physical buttons of the security alarm device, operation modes of the security alarm device, and/or hardware, firmware and software features of the security alarm device.

In some embodiments, testing the security alarm device may comprise automatically testing some key functions of the security alarm device based on the test software running on the test computer. The key functions may include but are not limited to: abilities to communicate via a USB cable, measure temperature, and/or validate battery voltage, a microphone, a speaker, LED functionality, physical button functionality, motion sensing functionality, Wi-Fi connection, etc.

In some embodiments, during the testing of the security alarm device, the system may automatically test a Wi-Fi connection of the security alarm device, based on the test software. The Wi-Fi connection functionality may be tested with other tests being performed in the background.

In some embodiments, before the testing, the system automatically pairs each security alarm device with a corresponding user account under control of the test software. In some embodiments, after the testing, a report of test results of the testing is automatically generated in association with the corresponding user account by the test computer; then the system automatically un-pairs the corresponding security alarm device from the corresponding user account under control of the test software.

During the automatic testing, for each successful test, a pass signal is sent to the test computer, which may display a green check or another indication on the user monitor 180. The user monitor 180 is electrically connected to the test computer and configured for providing and displaying one or more results of the testing of the security alarm device. After the automatic testing is completed, the test computer may automatically send a result of the testing of the security alarm device to the user monitor 180 for display. Failure codes related to the automatic testing will be sent to a database to be stored thereon. The test result can be printed out with a serial number (e.g. IMEI), a bar code associated with the test, and/or a label corresponding to the failure codes.

The test computer comprises test software to drive the test functionality. The test software communicates with each alarm device directly or indirectly through a tablet, and triggers various test activities and notifies an operator to perform specific tasks as required by each test. Through all the features and subsystems described above, a test procedure can be made completely automated and parametric.

Figure 4:
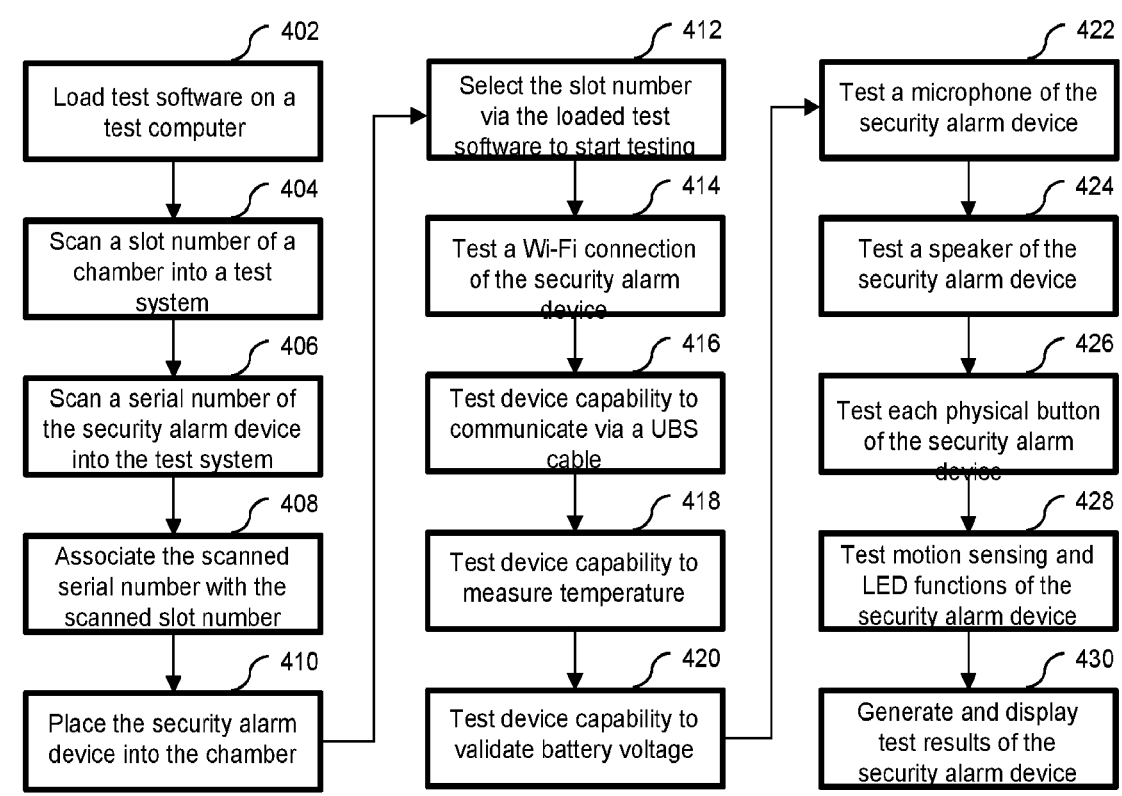
FIG. 4 is a flow chart showing an exemplary method for automatically testing a security alarm device, in accordance with some embodiments of the present disclosure.

FIG. 4 is a flow chart showing an exemplary method 400 for automatically testing a security alarm device. At operation 402, test software is loaded on a test computer. At operation 404, a slot number of a chamber is scanned into a test system. At operation 406, a serial number of the security alarm device is scanned into the test system. At operation 408, the scanned serial number is automatically associated with the scanned slot number. At operation 410, the security alarm device is placed into the chamber. Optionally at operation 412, the slot number is selected via the loaded test software to start automatic testing.

At operation 414, a Wi-Fi connection of the security alarm device is tested. At operation 416, capability of the security alarm device to communicate via a UBS cable is tested. At operation 418, capability of the security alarm device to measure temperature is tested. At operation 420, capability of the security alarm device to validate battery voltage is tested. At operation 422, a microphone of the security alarm device is tested. At operation 424, a speaker of the security alarm device is tested. At operation 426, each physical button on the security alarm device is tested. At operation 428, a motion sensing function and LED functions of the security alarm device are tested. At operation 430, test results of the security alarm device are generated and displayed, e.g. on a user monitor.

In one embodiment, operations 414 to 430 described above are performed automatically without any human intervention. The order of the operations shown in FIG. 4 may be changed according to different embodiments of the disclosure.

In some embodiments, a motion sensor, e.g. a Ring Alarm motion sensor, may be tested using the disclosed system. The motion sensor is placed in a test chamber which includes a base station device. Before testing any device, an operator may first set up each base station device and the testing software on the test computer.

In some embodiments, each base station device may be set up following a process like that described below. First, log into an app, e.g. a Ring app, associated with the motion sensor test with given login credentials. This will be followed by a prompt in the Ring app requesting a 2 Factor authentication code sent to a respective email account. Then, login the respective email account on a computer, use the authentication code received by this account to login to the Ring app. Then power on the base station device with the help of a 5V DC power adapter that can be connected at the back of the base station device. Afterwards, launch the Ring app on the phone or tablet, and tap on SET UP A DEVICE shown on screen. The following screen will ask the user to add a location for the base station device. Select any location listed on the Ring app and tap on the Continue button. If no location is found in the Ring app, follow the prompts to create a new location. If any location is not in use, delete it. Then, press the Pairing button for 1 to 2 seconds on the base station device until the blue ring on the base station device starts spinning. Tap on "Find my Base Station" prompt using the Ring app to pair the base station device to the Ring account. Next, connect the base station to the Internet. The next screen can tell the operator that the Ring Alarm Base station set up is successful. Tap on Continue to proceed to the next screen, which will ask the operator to agree to the Terms and Conditions for using the Ring alarm. Tap on "I Agree" to continue. On the next screen, skip the professional monitoring setup by tapping on "Cancel Sign Up." The next screen indicates that the ring alarm is being installed. Tap on the Menu icon on the top left corner and select Devices, to be able to see this base station as "Online" shown on screen.

In some embodiments, the testing application software on the test computer may be set up following a process like that described below. First, open the Tester Application software on the computer, e.g. by double clicking on a shortcut icon on the Desktop. Upon the next screen on the software interface, connect all the tablets to a USB HUB and connect the USB HUB to the test computer. Then, hit the Refresh button on this interface, to see all the serial numbers of the tablets under the "Active App Device Serial Numbers." The operator may select the Serial numbers in the appropriate slot only once. The software will save the details for the next time the operator restarts this application. Once selecting the serial number on all the slots, click OK at the bottom right corner. Once clicking OK, the software will drive to the next screen and will initialize all the 14 chambers one by one and turn Yellow to show "Scan in Data Below" message. This indicates that the software is ready to use.

In some embodiments, the test process for the motion sensor may include the following steps: (1) De-kitting the Motion Sensor; (2) Visual Inspection; (3) LED Function Test; (4) Connectivity Test/Tester Application; (5) Account Verification/Tester Application; (6) Firmware Update/Tester Application; (7) Motion Test/Tester Application; (8) Remove the Device/Tester Application; (9) Reapply Battery Pull Tab; and (10) De-kitting verification.

In some embodiments, step (1) of De-kitting the Motion Sensor further includes sub-steps like those below. First, open the de-kitting software on the computer by double clicking on the shortcut icon on the desktop. Then, select "Ring Alarm De-kitting Station". Enter the User ID in blank field in the new de-kitting software. Enter the Bench ID. In some embodiments, de-kitting needs to be performed after receiving the device and before the Firmware update process. If the Bench ID is incorrect, this software will provide a notification. Connect the Barcode Scanner to the computer. Scan the RO number on the label printed on the plastic bag. Scan the Serial number found on the inner side of the Motion Detector. Connect the QR code scanner to the computer. Scan the QR code located on the Motion Detector with the help of a QR code scanner. Check if the QR code on the back plate matches the QR code on the back of the motion sensor. If the QR code cannot be scanned, the device test fails. For Motion Detector, a success message should be displayed in a message box that says: 'Dekitting successful' or 'De-kitting not required'. If coming across a "Wrong Test Station!" error while trying to de-kit the device, check if the device is on the right test station or not. For any other issues, close and restart the test computer and make sure the test computer is connected to network.

In some embodiments, step (2) of Visual Inspection further includes sub-steps like below. First, inspect the Motion Sensor for any cosmetic damage (visible scratches, cracks, or dents on the sign) and also verify whether the QR code on the back cover of the Motion Sensor is visible to scan the QR code. Then, ensure that the Ring logo is visible. Fail the device if it has any cosmetic damage or if the cosmetic damage is above a predetermined subjective threshold.

In some embodiments, step (3) of LED Function Test further includes sub-steps like those below. First, remove the battery pull tab from the Motion Sensor, if there is one. Then, observe the LED pattern on the Motion Sensor to confirm if the device is still in a network or ready to pair. Tap the user button to perform this test. If a blinking green LED pattern is observed, the device is not attached to any end user account and is ready to pair. LED pattern to test if the device is registered to account: Press the user button on the Motion Detector. If the LED blinks green once, it is still a part of an existing network and can talk to Base Station. If the LED blinks red once, it indicates that the device might be a part of some existing network and cannot talk to the Base Station. In this case, perform a factory reset on these devices. To perform the factory reset: open the back cover; using a paper clip, press and hold the pinhole reset button; and observe the LED pattern while holding this reset button. GREEN LED blinks should be observed for 10 seconds followed by a steady RED LED for 3 seconds. If no LED pattern is observed and the device is not able to follow the factory reset step above, replace the battery in the device with a new battery and repeat the LED Function Test again. If the device comes with a package, discard the package before passing it to the tester.

In some embodiments, step (4) of the Connectivity Test/ Tester Application further includes sub-steps like those described below. First, ensure the Tester Application can display a screen showing "SCAN IN DATA BELOW." Then, make sure that the tablet/phone is connected to the Wi-Fi and has Ring app logged in with an appropriate account. The tablet/phone should be on the "DASH-BOARD" screen in order to start the automation properly. Make sure the device is in on state by pressing the user button. Then, scan the SLOT 01 barcode on the top of Chamber 1 to initiate automation on SLOT 1. Scan the RO number on the label printed on the plastic bag. Scan the QR code located on the Motion Detector. Scan the Serial number found on the inner side of the Motion Detector. The follow-ing screen will display the message "Pair Device Test—IN PROGRESS". This indicates that pairing process is in progress. To begin the pairing process, tester application will be waiting for user input. This will be indicated by the message "Hold the Button for 5 secs and Close the Door". Then, follow the prompt on the software application and Press and Hold the button on the device for 5 seconds. Close the door and scan the SLOT Number barcode on the tester, e.g. the security alarm device testing apparatus 100. This will start the automation and it will finish up the process for adding the device. If the GREEN LED is ON for 3 seconds, Device was added successfully. If the RED LED is ON for 3 secs, Device failed to add properly. If alternate Green and Red LED pattern is observed (alternate 500 ms interval), then the request for pairing this device is timed out.

In some embodiments, step (5) of Account Verification/ Tester Application further includes sub-steps like below. Once the device connects successfully to the Ring app and is online, the Tester application will begin the Account Verification process. This software will now capture the Serial number of the Motion detector and save the account details it was registered to in the Ring App. No user input is needed during this test. The automation will save the data to ensure that the Motion Detector was connected properly.

In some embodiments, step (6) of Firmware Update/ Tester Application further includes sub-steps like those below. The software will now proceed to perform the next task and will start the Firmware update on these devices. The software will check in the Ring App if Firmware update is available or not. If the software update is available, the software will go ahead and start the update and share the live update status on the Tester Application. Once the Firmware update is complete, this will be displayed on the software as "Firmware update-100%". The Tester application will then transition from "FIRMWARE UPDATE-IN PROGRESS" to "FIRMWARE UPDATE-PASS". This will indicate that the Firmware update has been performed correctly. If Firmware update is not available, then software will proceed to the next test.

In some embodiments, step (7) of Motion Test/Tester Application further includes sub-steps like those below. The software would then proceed to perform the Motion Test. To perform the motion test manually, wave a hand in front of the Motion Detector. This will trigger a motion on the Ring App. The Tester Application will capture the motion and proceed to the next part of the test. If the motion is not shown on the Ring App or the Tester Application, the Software will fail the test and the results will be reported.

In some embodiments, step (8) of Remove the Device/ Tester Application further includes sub-steps like those below. Once the Functional test is completed successfully, the software will go ahead and start the Removal process. This process will take care of removing the device properly using the "Remove device prompt". The software will start the removal process and will walk the user through the Ring App. Press the Remove button on the Ring App, and insert the paper clip in the pinhole reset button on the back of the Motion Detector to remove the device from the Base Station. Scan the Slot Number barcode label on the disclosed testing system, e.g. the security alarm device testing apparatus 100, and it will proceed to its next task. The software will perform a check to ensure that the Motion Detector is removed properly and log the details into a database. The Software Slot Number will turn green at the end of the test. This will indicate that the Motion Detector was properly paired, tested and removed from the Base Station. Place the Motion Sensor in the correct bag and Scan the results to Pass this device for Functional test results.

In some embodiments, step (9) of Reapply Battery Pull Tab further includes sub-steps like those described below. Reapply the Tab and place it on the battery. Also make sure that the device is not powering up. Replace all the old batteries with a brand new battery. Discard the old battery.

In some embodiments, step (10) of De-kitting verification further includes sub-steps like those below. Verify whether the Device Under Test (DUT) is de-kitted by opening the software and scanning the QR code on the Motion Detector. Click on the "Ring Alarm Post Functional Verification Station" button on the software. Connect the Barcode Scan-ner to the test computer. Scan the RO number on the label printed on the plastic bag. Scan the Serial number found on the inner side of the Motion Detector. Connect the QR code scanner to the test computer. Scan the QR code located on the Motion Detector with the help of a QR code scanner. For Motion Detector, a success message should be displayed in a message box that says: "Dekitting successful" or "De-kitting not required." If coming across a "Wrong Test Station!" error while trying to de-kit the device, check if the device is on the right test station. For any other issues, close and restart the test computer and make sure the test computer is connected to network.

In some embodiments, a contact sensor, e.g. a Ring Alarm contact sensor, may be tested using the disclosed system. The contact sensor is placed in a test chamber which includes a base station. Each base station device and the testing software on the test computer can be set up as discussed above regarding testing the Ring Alarm motion sensor.

In some embodiments, the test process for the contact sensor may include the following steps: (1) De-kitting the Contact Sensor; (2) Visual Inspection; (3) LED Function Test; (4) Connectivity Test/Tester Application; (5) Account Verification/Tester Application; (6) Firmware Update/Tester Application; (7) Contact Test/Tester Application; (8) Remove the Device/Tester Application; (9) Reapply Battery Pull Tab; and (10) De-kitting verification. Most of these steps can be performed the same as the corresponding steps for testing the Ring Alarm motion sensor as discussed above, except step (7).

In some embodiments, step (7) of Contact Test/Tester Application further includes sub-steps like those below. The software would proceed to perform the Contact Test after account verification and possible firmware update. To perform contact test manually, move the golden magnet away from the contact sensor (e.g. with at least 5 inches of a distance between them). Once hearing a chirp sound on the base station, place the contact sensor close to the magnet and wait for a couple of seconds. Then, move the magnet away from the contact sensor. This will ensure that the contact test is successful.

In some embodiments, a security camera, e.g. a Blink Catalina camera, may be tested using the disclosed system. The security camera is placed in a test chamber which includes a camera jig, a single board computer (SBC), and a sync module.

Before testing the security camera, the testing software on the test computer can be set up following a process like that described below. First, open the Tester Application Software on the computer, e.g. by double clicking the shortcut icon upon the Desktop. Once the application is started, there will be two options. Select "Blink" then click "BEGIN" to continue. Then, perform Serial Connection/COM port Setup, which may include the following steps. The COM Port Setup will only be performed by Site Engineers and is only required at initial installation of the disclosed tester system and when a hardware change occurs.

In some embodiment, the Serial Connection/COM port Setup begins with all USB cables disconnected from the Slot back planes (back side of tester). The software suite allows for testing both Blink cameras and Blink sync modules in the same tester simultaneously. This setup screen allows the slots to be configured for either kind of device. Click on the button "Change COM Port Settings". The setup defaults to a Sync Module setup for all slots. For each Slot where the camera is tested, perform the following steps. First, click on the corresponding "CAM" radio button. The Device selection automatically changes to "ACMO" and is disabled and that the Open Cover Sync Module (OCSM) and QCT selections are active with their corresponding change boxes checked. The check boxes set which drop down list(s) get updated when Refresh is clicked. So all checked list(s) will reset to "None" even if one already sets the value in a previous step. Un-check after each selection is made. Then, plug the USB cable into the back plane for the OCSM, and click the Refresh button, to see a new COM port show up in the list on the left. Use the drop down list for the OCSM to set this COM port value, and click to un-check the change box. Repeat previous step for the QCT, and un-check the change box when finished. Once the OCSM and QCT COM ports are set, the slot status color will change from dark gray to aqua. If all Slots to be used show as "Selected", click on Continue (Save and Exit for Initial/Change Setup).

In some embodiments, the test process for the Blink Catalina camera may include the following steps: (1) Test setup; (2) Internal Component Tests; (3) Audio Test; (4) LED Test; (5) Push Button Test; (6) Motion Test; (7) Low Frequency Radio (LFR) Test; (8) Wi-Fi Test; (9) Video Streaming Test; (10) Flash Production Firmware; (11) Quiescent Current (QC) Test, and (12) Test Results storage.

In some embodiments, step (1) of Test setup further includes sub-steps like those below. First, scan the slot barcode on the top of the chamber to prepare DUT for testing. The software will bring up a pop-up screen called "DUT Information". Scan in the QR Code on the back of the device to begin the test. The software will prompt an instruction to plug in the Camera. Plug in the micro USB cable which is in the chamber and then scan the slot barcode. Once the device is connected, the test will begin.

In some embodiments, step (2) of Internal Component Tests further includes sub-steps like those below. This test step is automated and is comprised of seven quick tests. A failure during any of these tests will result in the DUT failing the overall test and testing will stop. The tests to be run in this step includes: Validate and log Device Serial Number (DSN); Validate and log MAC address (MAC); Validate Board Firmware Version (BFW); Capture Main Board Serial Number (MSN); Capture Mezzanine Board Serial Number (ZSN); Validate Temperature (TMP); and Validate Battery Voltage (BAT).

In some embodiments, step (3) of Audio Test further includes sub-steps like those below. This test step is automated and comprised of three subtests, each playing a different frequency tone (500, 1000, 2000 Hz). The test will pass if the audio is played and received correctly by the DUT.

In some embodiments, step (4) of LED Test further includes sub-steps like those below. This test step is manual and comprised of 4 subtests. There are two Red LED Tests. First, open the Chamber and remove the camera from the fixture to check if the camera has a Red LED turned ON. If yes, then scan "YES"; if not, then Scan "NO" to fail the camera. Second, check if the Red LED is flashing red. If yes, then scan "YES"; if not, then scan "NO" to fail the camera. There are two Blue LED Tests. First, keeping the camera in hand, check if the camera has a Blue LED turned ON. If yes, then scan "YES"; if not, then Scan "NO" to fail the camera. Second, check if the Blue LED is turned OFF. If yes, then scan "YES"; if not, then scan "NO" to fail the camera.

In some embodiments, step (5) of Push Button Test further includes sub-steps like those below. This test step is manual. Software will prompt an instruction to push the reset button at back of the camera. Press the Push Button and then scan the slot barcode. Test will pass automatically once button press detected by DUT. The push button location is on the back of the camera.

In some embodiments, step (6) of Motion Test further includes sub-steps like those 'below. Software will prompt an instruction for an operator to wave hand in front of the camera. Keeping the camera in one hand, and wave the other hand in front of the camera, and then Scan the slot.

In some embodiments, step (7) of LFR Test and step (8) of Wi-Fi Test are both automated.

In some embodiments, step (9) of Video Streaming Test further includes sub-steps like those below. This test step is manual. The video stream can take up to 30 seconds to begin. During that time, a wait screen is shown before beginning the test. Remove the camera from the chamber without disconnecting power. Point the camera towards the door and hold device close to the door. Once the video starts streaming, an instruction is prompted for the operator to press the Reset Button and check if a White Screen is seen. Scan "YES", if seeing a White Screen; otherwise, Scan "NO" to fail the camera. Software will prompt an instruction to press the Reset Button again and check if the Video is Black and White. Scan "YES" if seeing the video in Black and White; otherwise, Scan "NO" to fail the camera. Software will prompt an instruction to press the Reset Button again and check if the Video is in Normal Color Image (Day Mode). Scan "YES" if seeing the video in Color image; otherwise, Scan "NO" to fail the camera.

In some embodiments, step (10) of Flash Production Firmware test is automated.

In some embodiments, step (11) of QC Test further includes sub-steps like those below. This test step is automated, with a manual setup step. Software will prompt an instruction to remove the micro USB cable from the camera and plug in the dummy batteries into the camera. Then, Scan the slot number to begin the test.

In some embodiments, once the test is complete, at step (12) of Test Results storage, the test results will be sent to a database automatically. Logs of the test will be saved locally.

In some embodiments, a security camera, e.g. a Blink Vinnie camera, may be tested using the disclosed system. The security camera is placed in a test chamber which includes a golden Catalina camera, and a sync module test fixture.

Before testing the Blink Vinnie camera, the testing software on the test computer can be set up following a process like that described below. First, open the Tester Application Software on the computer, e.g. by double clicking the shortcut icon upon the Desktop. Once the application is started, there will be two options. Select "Blink" then click "BEGIN" to continue. Then, perform Serial Connection/ COM port Setup, which may include the following steps. The COM Port Setup will only be performed by Site Engineers and is only required at initial installation of the disclosed tester system and when a hardware change occurs.

In some embodiment, the Serial Connection/COM port Setup begins with all USB cables disconnected. Starting with Slot01 and working up sequentially, plug in the USB to serial cable to the back of the chamber. Do not move on from the slot until the COM port is assigned. Click on the button "Change COM Port Settings". Accept the popup that all current settings will be cleared. If there are no active COM ports in the Ports Available list, click on "Refresh". The COM port assigned to the USB plugged in should now be visible. Assign that COM port to Slot01. Continue plugging in cables, clicking refresh, and slot assignment for all remaining slots. If all slots are selected, click on Continue.

Before testing the Blink Vinnie camera, the golden cameras can be set up following a process like that described below. Camera Setup will only be performed by Site Engineers and is only required at initial installation of the disclosed tester system and when a hardware change occurs. On the main application screen in the title bar, click on "Golden Camera Setup". Starting with Slot01, scan the QR code of the camera to be added to that slot, then connect the camera to one of the AC powered USB cables. Repeat the previous steps for all remaining slots.

In some embodiments, the test process for the Blink Vinnie camera may include the following steps: (1) Test setup; (2) Internal Component Tests; (3) LED Test; (4) Push Button Test; (5) LFR Test; (6) Wi-Fi Test; (7) Clear Residual Manufacturing Data; (8) Flash Production Code; and (9) Test Results storage.

In some embodiments, step (1) of Test setup further includes sub-steps like those below. First, scan the slot barcode on the top of the slot to initiate automation. The software will prompt an instruction to scan the RO number on the label and then scan the QR code at the back of the sync Module. The software will prompt an instruction to plug in Vinnie Sync Module 2. Connect the sync module to the available AC powered USB cable.

In some embodiments, step (2) of Internal Component Tests further includes sub-steps like those below. Once the device is connected, the automated tests will begin. A failure during any of these tests will result in the DUT failing the overall test and testing will stop. The tests to be run in this step includes: Validate the Firmware (VFW); Check Calibration Region (CCR); Region Code (REG); Serial Number (DSN); and Log MAC address (MAC).

In some embodiments, step (3) of LED Test further includes sub-steps like those below. First, for Red LED Test; open the Chamber and check if the Sync Module has a Red LED turned ON. If yes, then scan "YES"; if not, then Scan "NO" to fail the Sync Module. Check if the Red LED has turned OFF. If yes, then scan "YES"; if not, then scan "NO" to fail the Sync Module. Then, for Blue LED Test, open the Chamber and check if the Sync Module has a Blue LED turned ON. If yes, then scan "YES"; if not, then Scan "NO" to fail the Sync Module. Check if the Blue LED has turned OFF. If yes, then scan "YES"; if not, then scan "NO" to fail the Sync Module. Then for Green LED Test, open the Chamber and check if the Sync Module has a Green LED turned ON. If yes, then scan "YES"; if not, then Scan "NO" to fail the Sync Module. Check if the Green LED has turned OFF. If yes, then scan "YES"; if not, then scan "NO" to fail the Sync Module.

In some embodiments, step (4) of Push Button Test further includes sub-steps like those below. First, an instruction is prompted to scan the slot to start the test. It will then prompt an instruction to press and hold the reset button which is on the side of the sync module near the USB port. Once the Push button is detected, an instruction is prompted to release the button. Once the release is detected, the test will be passed automatically.

In some embodiments, step (5) of LFR Test further includes sub-steps like those below. Close the door to the chamber. An instruction is prompted to cycle power to the golden camera in the slot, then scan the slot to continue. The remainder of the test is automated.

In some embodiments, step (6) of Wi-Fi Test further includes sub-steps like those below. An instruction is prompted to open the chamber door, then scan the slot to continue. The remainder of the test is automated.

In some embodiments, step (7) of Clear Residual Manufacturing Data further includes sub-steps like those below. This test is fully automated and requires no action. One can close the chamber door for the remainder of the test.

In some embodiments, step (8) of Flash Production Code is fully automated and will update the progress periodically or from time-to-time. In some embodiments, at step (9) of Test Results storage, scan the DUT as PASS if all the above tests pass, and save the test results in a storage.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, app, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network or as an app on a mobile device such as a tablet, Phablet, PDA, smartphone, or wearable technology The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer or mobile device, smartphone or tablet. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a mobile smartphone, a personal digital assistant (PDA), tablet, a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or other monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Although examples are illustrated and described herein, embodiments are nevertheless not limited to the details shown, since various modifications and structural changes may be made therein by those of ordinary skill within the scope and range of equivalents of the claims.

The invention claimed is:

1. A system for automatically testing security alarm devices, comprising:
   a plurality of test chambers coupled on a frame, wherein each of the test chambers is configured to house a corresponding one of a plurality of security alarm devices to be tested; and
   a test computer coupled to the frame, wherein the computer has a processor and a non-transitory computer readable storage medium for automatically testing the plurality of security alarm devices at the same time using a test software, wherein each of the plurality of security alarm devices is connected to the test computer; and
   wherein before the testing: the test computer automatically pairs each security alarm device with a corresponding user account under control of the test software.

2. The system of claim 1, wherein:
   each of the plurality of security alarm devices is at least one of: a home security alarm device, a security camera, or a motion sensor device.

3. The system of claim 1, wherein the testing comprises testing at least one of:
   capability of each security alarm device to communicate via a UBS cable;
   capability of each security alarm device to measure temperature;
   capability of each security alarm device to validate battery voltage;
   a Wi-Fi connection of each security alarm device;
   a microphone of each security alarm device;
   a speaker of each security alarm device;
   button functions of each security alarm device;
   a motion sensing function of each security alarm device; or
   LED functions of each security alarm device.

4. The system of claim 1, wherein after the testing:

a report of test results of the testing is automatically generated in association with the corresponding user account and uploaded to a database by the test computer; and the test computer automatically un-pairs each security alarm device from the corresponding user account under control of the test software.

5. The system of claim 1, further comprising:

a user monitor electrically connected to the test computer and configured for providing test results of the plurality of security alarm devices.

6. The system of claim 1, further comprising:

a plurality of radio frequency (RF) shielded cabinets each contained in a respective one of the plurality of test chambers therein.

7. The system of claim 6, wherein:

each of the plurality of security alarm devices is wirelessly connected to a base station device inside the respective test chamber;

the base station device is wire-connected to a tablet corresponding to the respective test chamber; and the tablet is placed outside the test chambers and is wire-connected to the test computer via a network switch.

8. The system of claim 6, wherein:

each of the plurality of security alarm devices is wirelessly connected to a single board computer inside the respective test chamber; and the single board computer is wire-connected to the test computer via a network switch.

9. A system for automatically testing a plurality of electronic devices, comprising:

a plurality of radio frequency (RF) shielded cabinets coupled to a frame, wherein each of the RF shielded cabinets comprises:

a mounting device configured to receive a corresponding one of the plurality of electronic devices;

a unique identifier associated with each of the plurality of RF shielded cabinets;

an antenna configured to wirelessly communicate with the corresponding one of the plurality of electronic devices; and an interface configured to allow passage of an electrical signal from the antenna through a wall of the RF shielded cabinet to a terminal mounted on the outside of the RF shielded cabinet;

a test computer coupled to the frame, wherein the test computer includes a processor and a non-transitory computer readable storage medium, and wherein the test computer is operably connected to the terminal of each of the plurality of RF shielded cabinets;

a display coupled to the frame, wherein the display is operably connected to the test computer;

wherein the test computer is configured to simultaneously test each of the plurality of electronic devices wherein each of the plurality of electronic devices includes an identity code;

a scanning device operably connected to the test computer, wherein the scanning device is configured to read, for each of the plurality of RF shielded cabinets and the corresponding one of the plurality of electronic devices, the unique identifier of the RF shielded cabinet and the identity code of the corresponding electronic device, and transmits the unique identifiers and the identity codes to the test computer;

wherein the test computer receives the unique identifiers and the identity codes from the scanning device and associates each unique identifier with the identity code of the corresponding electronic device, and associates each of the identity codes with a predetermined test procedure for that identity code; and wherein the test computer sends a signal to the plurality of RF shielded cabinets to test the plurality of electronic devices based on the associated identity code.

10. The system of claim 9, wherein each of the plurality of electronic devices is tested simultaneously.

11. The system of claim 9 wherein results of the testing of the plurality of electronic devices are shown on the display.

12. The system of claim 9, wherein a first set of electronic devices of the plurality of electronic devices have a first identity code and a second set of electronic devices of the plurality of electronic devices have a second identity code, and wherein the test computer sends a first signal to the plurality of RF shielded cabinets associated with the first set of electronic devices, and wherein the test computer sends a second signal to the plurality of RF shielded cabinets associated with the second set of electronic devices.

13. The system of claim 12, wherein the first signal includes first instructions for testing the first set of electronic devices using a first predetermined test procedure and the second signal includes second instructions for testing the second set of electronic devices using a second predetermined test procedure.

14. The system of claim 13, whereupon after completion of the first predetermined test procedure for each of the electronic devices in the first set, the test computer disassociates, for each of the plurality of RF shielded cabinets associated with the first set of electronic devices, the unique identifier from the identity code of the corresponding electronic device.

* * * * *